Dec. 22, 1970  N. W. SCHULER  3,549,248
OPTICAL DEVICES COMPRISING CELLULOSE ACETATE AND
CELLULOSE ACETATE BUTYRATE
Filed Dec. 15, 1967
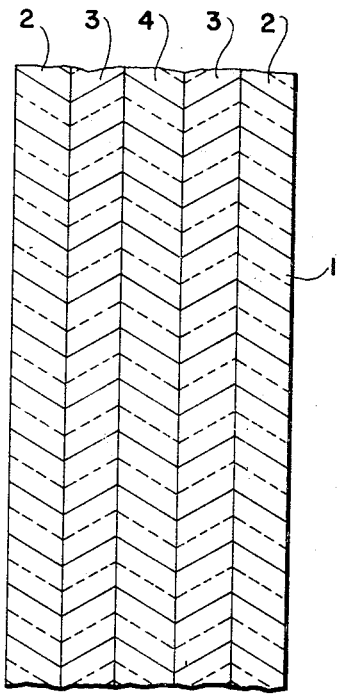
FIG. I
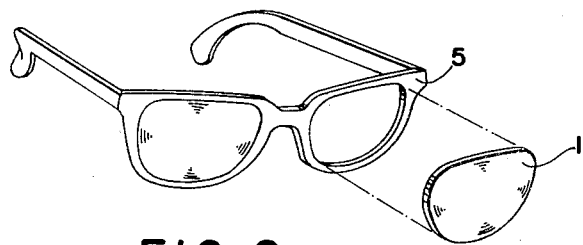
FIG. 2
INVENTOR.
Norman Schuler
BY
Brown and Mikulka
Sheldon W. Rothstein
ATTORNEYS

United States Patent Office 3,549,248
Patented Dec. 22, 1970

3,549,248
OPTICAL DEVICES COMPRISING CELLULOSE ACETATE AND CELLULOSE ACETATE BUTYRATE
Norman W. Schuler, Lexington, Mass., assignor to Polaroid Corporation, Cambridge, Mass., a corporation of Delaware
Filed Dec. 15, 1967, Ser. No. 690,925
Int. Cl. G02c 1/06, 7/12
U.S. Cl. 351—154                3 Claims

ABSTRACT OF THE DISCLOSURE

When synthetic plastic elements comprising cellulose acetate butyrate are placed in intimate contact with conventionally plasticized cellulose acetate, plasticizer migration from the cellulose acetate to the cellulose acetate butyrate occurs resulting in undesirable effects. This may be avoided by plasticizing the cellulose acetate with a compound represented by the formula:

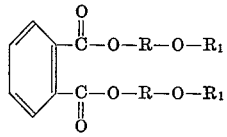

wherein R is an alkylene group containing from 1 to 4 carbon atoms, and $R_1$ is selected from the group consisting of methyl and ethyl groups.

---

The instant invention relates to the utilization of plasticized cellulose acetate material in a composite structure in intimate contact with other synthetic plastic materials.

More particularly this invention comprises the utilization of plasticized cellulose acetate eyeglass frames in conjunction with plastic lenses, particularly of the polarizer type.

Typical eyeglasses of the plastic lens variety, and especially those containing plastic polarizing lenses, such as is disclosed, for example, in the applications of Buzzell, Ser. No. 577,578, filed Sept. 2, 1966, and Bloom, Ser. No. 577,576, filed Sept. 2, 1966, incorporated herein by reference, generally comprise synthetic, plastic frame material which secures the lenses in place by engaging them about their edges. The frame may be formed of any suitable synthetic plastic material. However, when hardness, luster, and economy are considered, cellulose nitrate has proven itself to be the most advantageous material available for this purpose. As is well known, however, the great drawback in using cellulose nitrate is its extreme flammability, which makes it a very unsafe material to utilize in any environment which may bring it in contact with a combustion stimulant, such as, for example, a cigarette lighter, etc.

Plasticized cellulose acetate is found to possess properties more nearly akin to cellulose nitrate than any other synthetic plastic material which is capable of being used as a lens retaining device. Conventionally, plasticized cellulose acetate, however, is somewhat deficient in that it is inherently neither as hard as nor as lustrous as cellulose nitrate. Additionally, it has been found that whenever a plastic lens containing cellulose acetate butyrate is utilized in conjunction with a frame material comprising cellulose acetate, conventional plasticizer from the cellulose acetate material will migrate into the cellulose acetate butyrate component of the lense structure and cause deformation of the lens structure, for example, as a result of the blistering and swelling of the cellulose acetate butyrate.

Accordingly, it is a primary object of the present invention to provide a cellulose acetate plasticizer which will not migrate from said cellulose acetate into a cellulose acetate butyrate material in intimate relationship therewith.

It is another object of the present invention to provide novel composite optical devices which comprise plasticized cellulose acetate frame material in conjunction with composite lens structures containing cellulose acetate butyrate.

It is still another object of the present invention to provide a plasticized cellulose acetate material with increased hardness and luster as compared with conventionally plasticized cellulose acetate.

Other objects of the invention will in part be obvious and will in part appear hereinafter.

The invention accordingly comprises the product possessing the features, properties and relation of components which are exemplified in the following detailed disclosure and the scope of the application of which will be indicated in the claims.

For a fuller understanding of the nature and objects of the invention, reference should be had to the following detailed description taken in connection with the accompanying drawings wherein:

FIG. 1 is an enlarged diagrammatic sectional view of a composite lens structure for eyeglasses or the like which may be utilized in the present invention; and FIG. 2 is a partially exploded perspective view of eye glasses or like optical devices containing a lense system such as that described in FIG. 1.

A typical plastic lens composite structure 1, such as for example, a light polarizing lens structure, as depicted in FIG. 1, may comprise an optical system including a light polarizer, 4, laminated between two sheets of transparent plastic material, 3, the outer or free surfaces of which may be provided with abrasion resistant coatings, 2. The polarizing sheet may be, for example, a molecularly oriented plastic sheet material which has been stained or dyed to render it light polarizing, e.g., molecularly oriented polyvinyl alcohol stained with iodine. The transparent plastic between which the polarizer sheet is laminated may, for example, be a thermoplastic cellulose derivative, e.g., cellulose nitrate, cellulose triacetate, cellulose acetate propionate, cellulose acetate butyrate, ethyl cellulose, etc. and the abrasion resistant coating may, for example, be a completely polymerized melamine formaldehyde resin, a thermosetting cross-linked polymer such as a diethylenic substituted polyalkylene glycol, e.g., polymeric coatings formed by in situ polymerization of polyalkylene glycol diesters of $\alpha,\beta$-unsaturated carboxylic acids on the plastic sheet material, etc. Plastic laminations, including materials of this description, are disclosed, for example, in U.S. Pat. Nos., 2,237,567; 2,527,400; 2,554,850; 3,081,192; and 3,097,106.

In a commercial embodiment of composite lenses of the type disclosed above and to which the instant application is specifically directed, the plastic sheet material laminated to each side of the polarizer material comprises cellulose acetate butyrate. The composite lenses, 1, are then inserted into a suitable lens-retaining device, 5, as depicted in FIG. 2, by means well known in the art. It has been discovered, however, that it is not possible to effectively use cellulose acetate, plasticized with the usual well-known plasticizers, as the plastic material for frame members adapted to retain lenses containing cellulose acetate butyrate, since conventional plasticizer materials in cellulose acetate preferentially migrate to the cellulose acetate butyrate environment to provide the undesirable effects detailed hereinafter. In the instance where cellulose acetate butyrate is contained in an optical device, in intimate relationship with a conventionally plasticized cellulose acetate member, such as in eyeglasses, etc., such migration provides blushing, small localized lens effects and blistering, making for a very unattractive and unsalable product.

It has been quite unexpectedly discovered, however, that the use of certain plasticizers of a very limited class, that is, the class represented by the following formula:

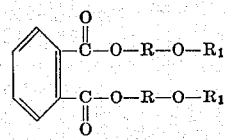

wherein R is an alkylene group containing from 1–4 carbon atoms, and $R_1$ is a methyl or ethyl group, provides plasticized cellulose acetate with the unexpected property of plasticizer retention in that the above-described plasticizer does not migrae into contiguous cellulose acetate butyrate, and, as a wholly unexpected by-product of the use of said plasticizer, it has been found that there is a decreased cellulose acetate shrinkage during its use in fabrication of ophthalmic frame members. What is even more important, is that an unusual degree of hardness is imparted to cellulose acetate by the utilization of plasticizers of the above-mentioned class; a degree of hardness comparable to cellulose nitrate.

The preferred plasticizer for utilization in the instant environment is dimethoxyethyl phthalate. In addition, where desired, the machinability or maleability properties of the plasticized cellulose acetate may be enhanced by the addition of small quantities, for example, in the area of 5% by weight, of triphenyl phosphate or diphenyl cresyl phosphate.

In general, cellulose acetate spectacle frames may be manufactured by any conventional procedure such as, for example, injection molding; punching the frames out of a sheet of material, either hot or cold, and then subsequently tumbling said punched material in a bath of abrasives; etc. The precise method utilized in the actual shaping operation is quite immaterial to the present invention; however, it has been found that exceptionally good results are achieved when lens-retaining frames fabricated from cellulose acetate plasticizer according to the instant invention are formed by molding.

Likewise, the precise lens material utilized in the present invention is material only to the extent that it comprises cellulose acetate butyrate which is to be placed in intimate contact with the frame material. Typical methods of preparing such lenses containing cellulose acetate butyrate layers with a polarizing material sandwiched therebetween are described in the above-mentioned applications of Buzzell and Bloom, Ser. Nos. 577,578 and 577,576, respectively. It will be appreciated from a reading of the above applications that lamination of the cellulose acetate butyrate material to the polyvinyl alcohol polarizing sheet may be accomplished either by subcoating the cellulose acetate butyrate material with a suitable compound such as, for example, cellulose nitrate, and then laminating the subbed material to the polyvinyl alcohol light-polarizing sheet using a well-known pressure roll technique with a typical adhesive for such material, such as a 2% polyvinyl alcohol solution; or, alternatively, the lamination may be accomplished by the conversion of the surface of the cellulose acetate butyrate to cellulose, subcoating the surface with polyvinyl alcohol, and pressure laminating the subbed cellulose acetate butyrate to the light polarizing material, as more fully discussed in the Buzzell application mentioned above.

The following examples are considered illustrative only and should not be taken in a limiting sense.

EXAMPLE 1

In order to compare the migration characteristics of the plasticizers of the present invention with conventional cellulose acetate plasticizers, clear glass jars approximately four inches deep and three and a half inches in diameter equipped with screw-type lids were filled with typical cellulose acetate flake molding resins plasticized with various materials so that at least the bottom of the jar was completely covered. Various samples of flake cellulose acetate were utilized containing percentages of diethyl phthalate plasticizer from 20.3% up to 33%. Two other samples of plasticized cellulose acetate, one containing 4.7% of diphenyl cresyl phosphate and the other containing a mixture of 22.2% of diethyl phthalate and 5% of diphenyl cresyl phosphate were also used in this comparative migration test with samples of flake cellulose acetate which contained 32% and 37%, respectively, of dimethoxyethyl phthalate plasticizer.

Composite sunglass lenses comprising polyvinyl alcohol polarizer material sandwiched between layers of cellulose acetate butyrate having on the outside surface of each of said cellulose acetate butyrate layers an abrasion resistant coating, were placed over the resin layers in positions which guarantee contact between said lenses and said resins. The jars were then completely covered with metal foil and the lids screwed over the foil to provide a secure seal. To provide a control function, identical polarizing lenses were placed in jars similar to those described above without any plasticized resins. All of the jars were then placed in an oven at about 180° F. (dry heat) for 96 hours. Thereafter the jars were removed from the oven, allowed to cool to room temperature, opened, and the lenses carefully removed. The lenses were then inspected under a shadowgraph analyzer. In all instances except for controls and those wherein the resinous material contained dimethoxyethyl phthalate plasticizer, migration patterns were found to appear under the shadowgraph as extensive mottling or pool-like patterns caused by abnormal lens softening; extensive pattern striations or "fingers"; extensive pocking, or "orange peel"; localized swirling or wave-like patterns; and general extensive spotting, appearing on the shadowgraph as soft blending images rather than sharp definite images as caused by dust or other foreign particles. The procedure described above vividly demonstrates the compatability of dimethoxyethyl phthalate plasticized cellulose acetate with structures containing cellulose acetate butyrate.

EXAMPLE 2

In order to determine the effect of dimethoxyethyl phthalate plasticizer on the hardness of cellulose acetate materials, various plasticized cellulose acetate sheet materials were compounded using the following plasticizers:

(1) 32 parts of dimethoxyethyl phthalate (DMEP)
(2) 30 parts of dimethoxyethyl phthalate plus seven parts of triphenyl phosphate
(3) 35 parts of plasticizer comprising a 3 to 1 ratio of dimethoxyethyl phthalate and triphenyl phosphate
(4) 37 parts of dimethoxyethyl phthalate
(5) 35 parts of diethyl phthalate
(6) 31½ parts of diethyl phthalate and 3½ parts of diphenyl cresyl phosphate.

The rockwell hardness values of these samples were determined using the standard ASTM D–785, 62, proce- and nitro-cellulose composition plasticized with camphor. ard nitro-cellulose composition plasticized with camphor.

The tabulation below demonstrates the surprising effect dimethoxyethyl phthalate has on the hardness of cellulose acetate sheet material. When the cellulose acetate sheet material contains 32 parts of dimethoxyethyl phthalate as a plasticizer it completely unexpectedly exhibits the same degree of hardness as nitrocellulose. Increasing the dimethoxyethyl phthalate concentration slightly reduces the hardness and, as expected, the addition of triphenyl phosphate additionally tends to reduce the hardness of the cellulose acetate material. Of great interest is the fact that dimethoxyethyl phthalate plasticized cellulose acetate is far harder than cellulose acetate plasticized with diethyl phthalate, the most commonly used cellulose acetate plasticizer.

| Composition: | Rockwell hardness |
|---|---|
| Cellulose acetate plasticized with 32 parts DEMP | 97.6 |
| Cellulose acetate plasticized with 32 parts DEMP and 7 parts of triphenyl phosphate | 95.9 |
| Cellulose acetate plasticized with 35 parts of a 3 to 1 mixture of DMEP and triphenyl phosphate | 93.8 |
| Cellulose acetate plasticized with 37 parts of DMEP | 91.7 |
| Cellulose acetate plasticized with 35 parts of diethyl phthalate | 88.6 |
| Cellulose acetate plasticized with 31½ parts of diethyl phthalate and 3½ parts of diphenyl cresyl phosphate | 85.2 |
| Standard nitro cellulose sheet material plasticized with camphor | 97.6 |

It is not intended by the instant application to claim that the use of materials, which broadly fall within the above structural formula, for the plasticization of cellulose acetate is novel. For example, in British Pat. No. 455,654, in various examples therein, cellulose acetate is shown plasticized with dimethoxyethyl phthalate. This is likewise true of British Pat. No. 534,751 and U.S. Pat. No. 2,412,611. By the instant invention applicant herein claims only cellulose acetate, plasticized with compositions as described above, in conjunction with a second plastic material comprising cellulose acetate butyrate.

Since certain changes may be made in the above product without departing from the scope of the invention herein involved, it is intended that all matter contained in claims only celluose acetate, plasticized with com- drawings shall be interpreted as illustrative and not in a limiting sense.

What is claimed is:
1. An optical device including, in combination: at least one ophthalmic lens comprising cellulose acetate butyrate, and lens retaining means engaged around said lens element, said lens retaining means comprising cellulose acetate and a plasticizing quantity of a compound represented by the formula:

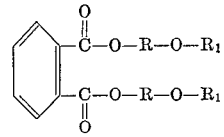

wherein R is an alkylene group containing from 1 to 4 carbon atoms, and $R_1$ is selected from the group consisting of methyl and ethyl groups.

2. The invention of claim 1 wherein said compound is dimethoxyethyl phthalate.

3. The invention of claim 2 wherein said cellulose acetate additionally contains a phosphate selected from the group consisting of triphenyl phosphate and diphenyl cresyl phosphate.

References Cited

UNITED STATES PATENTS

| 2,601,460 | 6/1952 | Salvin | 161(Solvent)DIG.UX |
| 2,712,774 | 7/1955 | Belgard | 351—177X |
| 3,097,106 | 7/1963 | Blout et al | 161—1X |

FOREIGN PATENTS

| 534,751 | 3/1941 | Great Britain. |

DAVID H. RUBIN, Primary Examiner

U.S. Cl. X.R.

351—49, 83